US011076381B2

(12) United States Patent
Bhatoolaul et al.

(10) Patent No.: US 11,076,381 B2
(45) Date of Patent: Jul. 27, 2021

(54) USING WAKE UP SIGNAL TO SKIP PAGING DCI

(71) Applicant: Nokia Technologies Oy, Espoo (FI)

(72) Inventors: David Bhatoolaul, Swindon (GB); Nitin Mangalvedhe, Hoffman Estates, IL (US); Matthew Baker, Cambridge (GB); Rapeepat Ratasuk, Inverness, IL (US); Chunhai Yao, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/763,605

(22) PCT Filed: Nov. 17, 2017

(86) PCT No.: PCT/CN2017/111750
§ 371 (c)(1),
(2) Date: May 13, 2020

(87) PCT Pub. No.: WO2019/095331
PCT Pub. Date: May 23, 2019

(65) Prior Publication Data
US 2020/0367199 A1 Nov. 19, 2020

(51) Int. Cl.
H04W 68/02 (2009.01)
H04W 76/28 (2018.01)
(Continued)

(52) U.S. Cl.
CPC ........... H04W 68/02 (2013.01); H04L 12/189 (2013.01); H04W 52/0235 (2013.01); H04W 72/042 (2013.01); H04W 76/28 (2018.02)

(58) Field of Classification Search
CPC ... H04W 68/02; H04W 72/04; H04W 72/042; H04W 52/02; H04W 52/0235;
(Continued)

(56) References Cited

U.S. PATENT DOCUMENTS

2007/0294740 A1* 12/2007 Drake et al. .................. 725/131
2014/0220916 A1* 8/2014 Mujtaba et al. ....... H04B 7/082
(Continued)

FOREIGN PATENT DOCUMENTS

CN 105493577 A 4/2016
CN 107223357 A 9/2017
(Continued)

OTHER PUBLICATIONS

"Wake up Signalling for efeMTC", 3GPP TSG RAN WG1 Meeting #90, R1-1712956, Agenda: 5.2.6.2, Sony, Aug. 21-25, 2017, 11 pages.
(Continued)

Primary Examiner — Meless N Zewdu
(74) Attorney, Agent, or Firm — Nokia Technologies Oy

(57) ABSTRACT

A method is provided including receiving, by a user equipment, a signal either before or during a paging occasion comprising an indication indicating whether the user equipment is to skip decoding of at least one subsequent channel of a plurality of subsequent channels associated with a paging message. The plurality of subsequent channels include: a first channel carrying downlink control information for the paging message, and a second channel carrying the paging message. In response to the indication indicating that the user equipment is to skip decoding of the at least one subsequent channel, skipping decoding of the at least one subsequent channel.

20 Claims, 3 Drawing Sheets

(51) Int. Cl.
*H04L 12/18* (2006.01)
*H04W 52/02* (2009.01)
*H04W 72/04* (2009.01)

(58) Field of Classification Search
CPC ... H04W 76/28; H04W 68/00; H04W 68/005; H04W 68/04; H04W 64/00; H04W 52/00; H04W 52/0209; H04W 52/0212; H04W 52/0216; H04W 52/0219; H04W 88/00; H04W 88/02; H04W 88/08; H04W 68/12; H04W 60/00; H04W 60/005; H04W 60/02; H04W 60/04; H04W 60/06; H04W 76/00; H04W 76/10; H04W 84/02; H04W 84/027; H04W 88/185; H04W 88/025; H04W 88/10; H04W 88/06; H04W 76/15; H04W 76/11; H04W 4/06; H04W 48/12; H04W 74/00; H04W 74/002; H04W 74/006; H04L 12/18; H04L 12/189; G06F 1/32; G06F 1/3203; G06F 1/3206
See application file for complete search history.

(56) References Cited

U.S. PATENT DOCUMENTS

2016/0353440 A1* 12/2016 Lee et al. .......... H04W 72/0453
2017/0111913 A1* 4/2017 Li et al. ............ H04W 72/0453
2017/0289965 A1* 10/2017 You et al. ........... H04W 72/042
2018/0332562 A1* 11/2018 Selvaganapathy et al. ................. H04W 68/02
2019/0036647 A1* 1/2019 Gowda et al. ........ H04L 1/0051

FOREIGN PATENT DOCUMENTS

| EP | 1499141 A2 | 1/2005 |
| EP | 3313131 A1 | 4/2018 |
| WO | 2016/119206 A1 | 8/2016 |
| WO | 2017/015831 A1 | 2/2017 |
| WO | 2017/079574 A1 | 5/2017 |

OTHER PUBLICATIONS

International Search Report and Written Opinion received for corresponding Patent Cooperation Treaty Application No. PCT/CN2017/111750, dated Jul. 30, 2018, 9 pages.
"Wake up Signalling for efeMTC", 3GPP TSG RAN WG1 Meeting #90, R1-1714576, Agenda: 5.2.6.2, Sony, Aug. 21-25, 2017, 12 pages.
Extended European Search Report received for corresponding European Patent Application No. 17931974.4, dated Jun. 4, 2021, 7 pages.
"Power saving signal or channel in NB-IoT", 3GPP TSG-RAN WG2 Meeting #99, Huawei, R2-1708301, Agenda Item: 9.13.9, Aug. 21-25, 2017, 4 pages.

* cited by examiner

300: RECEIVING, BY A USER EQUIPMENT, A SIGNAL EITHER BEFORE OR DURING A PAGING OCCASION COMPRISING AN INDICATION INDICATING WHETHER THE USER EQUIPMENT IS TO SKIP DECODING OF AT LEAST ONE SUBSEQUENT CHANNEL OF A PLURALITY OF SUBSEQUENT CHANNELS ASSOCIATED WITH A PAGING MESSAGE, WHEREIN THE PLURALITY OF SUBSEQUENT CHANNELS COMPRISE: A FIRST CHANNEL CARRYING DOWNLINK CONTROL INFORMATION FOR THE PAGING MESSAGE, AND A SECOND CHANNEL CARRYING THE PAGING MESSAGE

302: IN RESPONSE TO THE INDICATION INDICATING THAT THE USER EQUIPMENT IS TO SKIP DECODING OF THE AT LEAST ONE SUBSEQUENT CHANNEL, SKIPPING DECODING OF THE AT LEAST ONE SUBSEQUENT CHANNEL

FIG. 3

400: DETERMINING, BY A BASE STATION, WHETHER AT LEAST ONE USER EQUIPMENT IS TO SKIP EQUIPMENT IS TO SKIP DECODING OF AT LEAST ONE SUBSEQUENT CHANNEL OF A PLURALITY OF SUBSEQUENT CHANNELS ASSOCIATED WITH A PAGING MESSAGE, WHEREIN THE PLURALITY OF SUBSEQUENT CHANNELS COMPRISE: A FIRST CHANNEL CARRYING DOWNLINK CONTROL INFORMATION FOR THE PAGING MESSAGE, AND A SECOND CHANNEL CARRYING THE PAGING MESSAGE

402: IN RESPONSE TO THE INDICATION INDICATING THAT THE AT LEAST ONE USER EQUIPMENT IS TO SKIP DECODING OF THE AT LEAST ONE SUBSEQUENT CHANNEL, TRANSMITTING AN INDICATION TO THE AT LEAST ONE USER EQUIPMENT EITHER BEFORE OR DURING A PAGING OCCASION TO CAUSE THE AT LEAST ONE USER EQUIPMENT TO SKIP DECODING OF THE AT LEAST ONE SUBSEQUENT CHANNEL

FIG. 4

USING WAKE UP SIGNAL TO SKIP PAGING DCI

RELATED APPLICATION

This application claims priority to PCT Application No. PCT/CN2017/111750, filed on Nov. 17, 2017, which is incorporated herein by reference in its entirety.

TECHNICAL FIELD

This invention relates generally to wireless networks and, more specifically, relates to power saving signals in wireless networks.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

In current wireless networks (such as 4G wireless networks), a UE in idle mode is expected to be configured with DRX or eDRX. The UE wakes up once per DRX cycle to monitor paging during its paging occasion (PO). Furthermore, a UE configured with eDRX may also be configured with a paging time window (PTW) comprising several successive POs during which it monitors paging before going back to deep sleep.

3GPP Release-15 will provide enhancements to eMTC and NB-IoT. Among these enhancements is a power saving signal that is used to indicate whether a UE in idle mode needs to decode or monitor subsequent channels for paging. It was agreed in RAN1 #90bis that the power-saving signal would be a "wake-up signal or DTX". This means that a wake-up signal (WUS) will be transmitted by the eNB if the UE is required to decode the subsequent channel. If the UE can go back to sleep then nothing will be transmitted (DTX) to the UE.

A UE using the WUS performs at least the following 3-step operation in order to read its paging record:
  Step 1: Read/detect WUS;
  Step 2: Read downlink control information (DCI) related to a transmission of a paging message. The DCI is transmitted in a downlink control channel, such as MPDCCH/NPDCCH, carrying scheduling information. The DCI is read to determine characteristics such as scheduling information of the paging message transmission in a downlink channel, such as PDSCH/NPDSCH;
  Step 3: Read the paging message from the downlink channel, for example from PDSCH/NPDSCH.

Although Step 2 offers the network a degree of flexibility in selecting the characteristics of the paging message in the downlink channel, for example in PDSCH/NPDSCH, it also requires the UE to consume power just to the read the DCI even when the characteristics of the PDSCH/NPDSCH have not changed.

Information relevant to these teachings is described in the following document: 3GPP R1-1712956 in which a 2-step approach is suggested based on the conventional 2-step DCI based approach but using a "compact DCI" with significantly fewer bits than the existing paging DCI. By fixing certain DCI fields and reducing the CRC size to 8, the document claims a reduction of the DCI size from 28 to 12 bits. However, this document still suffers from disadvantages as it still requires decoding and/or CRC check.

BRIEF SUMMARY

This section is intended to include examples and is not intended to be limiting.

In an example of an embodiment, a method is disclosed that includes receiving, by a user equipment, a signal either before or during a paging occasion comprising an indication indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the user equipment is to skip decoding of the at least one subsequent channel, skipping decoding of the at least one subsequent channel.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: receive, by a user equipment, a signal either before or during a paging occasion comprising an indication indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the user equipment is to skip decoding of the at least one subsequent channel, skip decoding of the at least one subsequent channel.

In another example of an embodiment, an apparatus comprises means for receiving, by a user equipment, a signal either before or during a paging occasion comprising an indication indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the user equipment is to skip decoding of the at least one subsequent channel, means for skipping decoding of the at least one subsequent channel.

In an example of an embodiment, a method is disclosed that includes determining, by a base station, whether at least one user equipment is to skip equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the at least one user equipment is to skip decoding of the at least one subsequent channel, transmitting an indication to the at least one user equipment either before or during a paging occasion to cause the at least one user equipment to skip decoding of the at least one subsequent channel.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: determine, by a base station, whether at least one user equipment is to skip equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the at least one user equipment is to skip decoding of the at least one subsequent channel, transmit an indication to the at least one user equipment either before or during a paging occasion to cause the at least one user equipment to skip decoding of the at least one subsequent channel.

In another example of an embodiment, an apparatus comprises means for determining, by a base station, whether at least one user equipment is to skip equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the at least one user equipment is to skip decoding of the at least one subsequent channel, means for transmitting an indication to the at least one user equipment either before or during a paging occasion to cause the at least one user equipment to skip decoding of the at least one subsequent channel.

BRIEF DESCRIPTION OF THE DRAWINGS

In the attached Drawing Figures:

FIGS. 3 and 4 are logic flow diagrams for using a wake up signal to skip paging DCI, and illustrate the operation of exemplary methods, a result of execution of computer program instructions embodied on a computer readable memory, functions performed by logic implemented in hardware, and/or interconnected means for performing functions in accordance with exemplary embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Although the description below generally makes reference to LTE terms, this is not intended to be limiting and these teachings are equally applicable to other wireless networks, such as $5^{th}$ generation (5G) wireless networks. For example, the LTE term eNB is also applicable to a 5G base station (gNB) unless stated otherwise.

The exemplary embodiments herein describe techniques for using a wake up signal to skip paging DCI. Additional description of these techniques is presented after a system into which the exemplary embodiments may be used is described.

Figure 1:
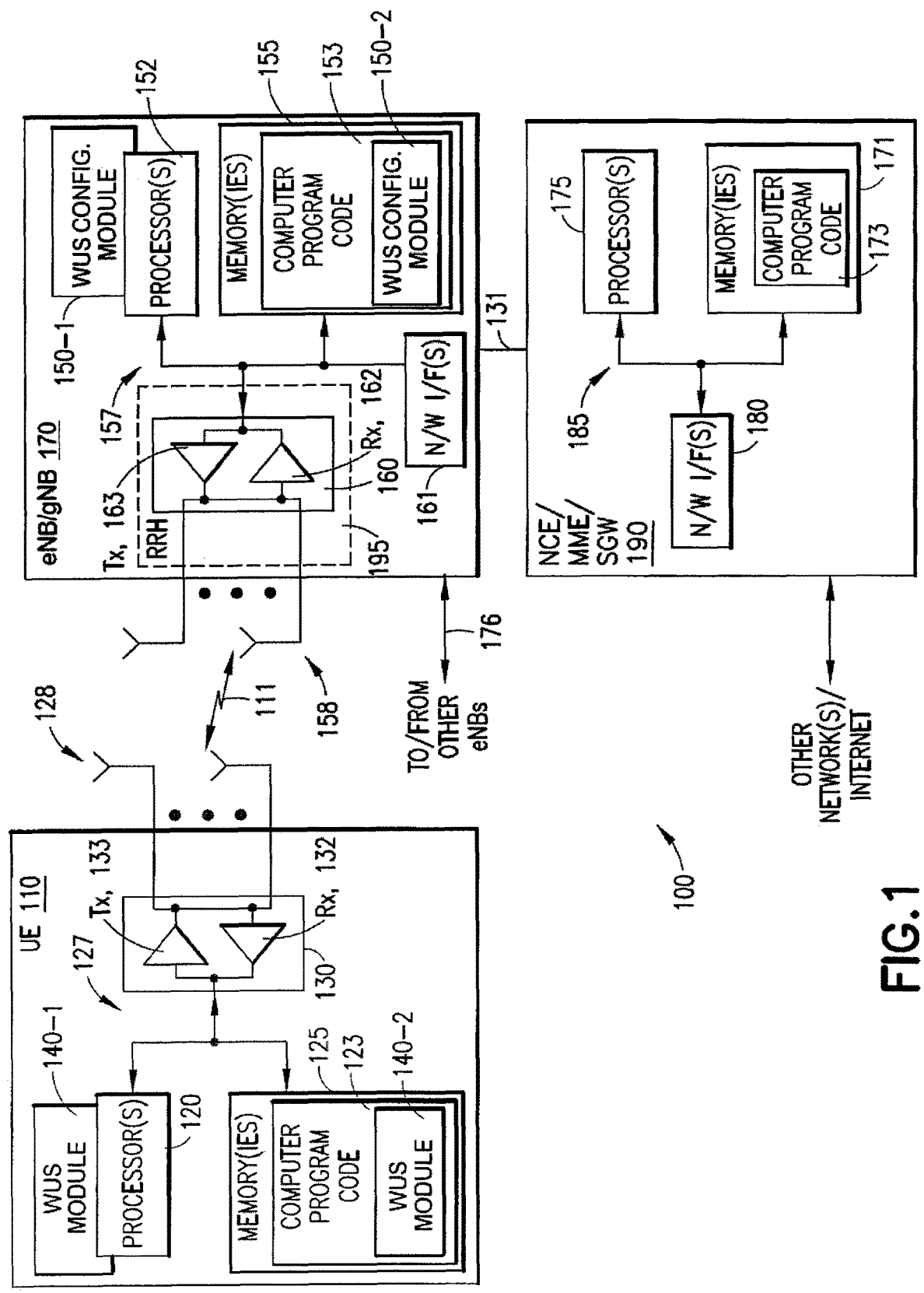
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a WUS module, comprising one of or both parts 140-1 and/or 140-2, which may be implemented in a number of ways. The WUS module may be implemented in hardware as WUS module 140-1, such as being implemented as part of the one or more processors 120. The WUS module 140-1 may be implemented also as an integrated circuit or through other hardware such as a programmable gate array. In another example, the WUS module may be implemented as WUS module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a WUS configuration (WUS config.) module, comprising one of or both parts 150-1 and/or 150-2, which may be implemented in a number of ways. The WUS configuration module may be implemented in hardware as WUS configuration module 150-1, such as being implemented as part of the one or more processors 152. The WUS configuration module 150-1 may be implemented also as an integrated circuit or through other hardware such as a programmable gate array. In another example, the WUS configuration module may be implemented as WUS configuration module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So, if there are three 120 degree cells per carrier and two carriers, then the eNB has a total of 6 cells.

The wireless network 100 may include one or more network control elements (NCE) 190 that may include MME (Mobility Management Entity) and/or SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Example embodiments fix certain paging PDSCH characteristics and also use two-step process, where the first step of the two-step approach is based on a wake up signal (WUS) that carries information directly and hence does not require decoding and/or CRC check.

Figure 2:
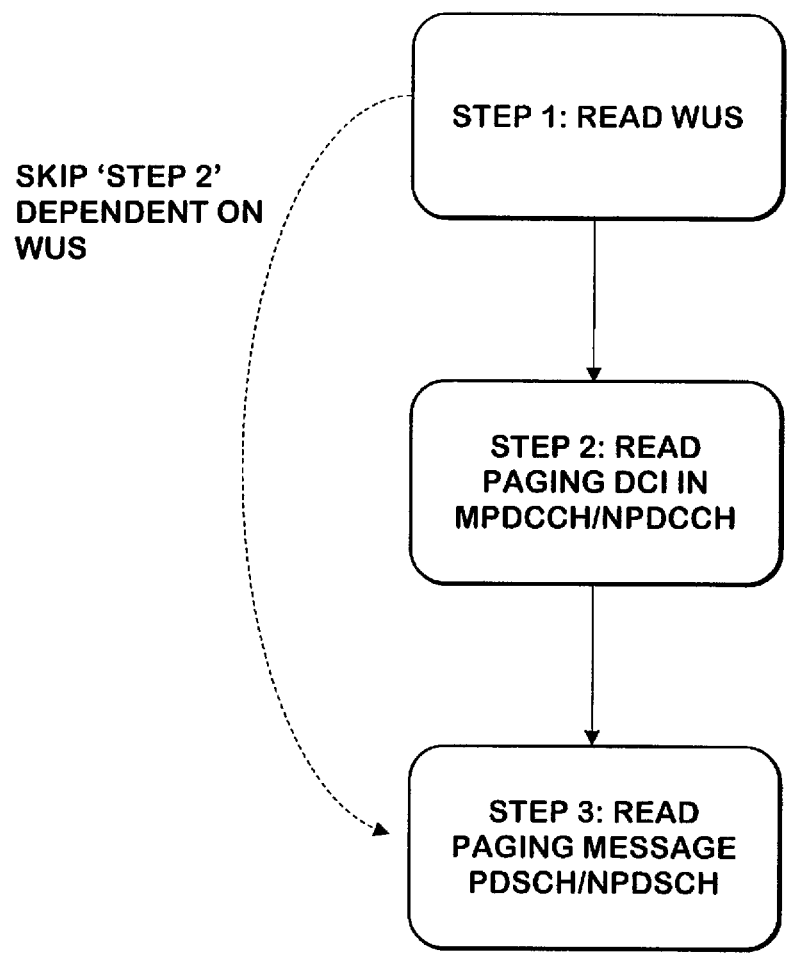
FIG. 2 is a high level flow chart in accordance with exemplary embodiments.

Referring now to FIG. 2, this figure shows a high level flow chart in accordance with an example embodiment. At Step 1 a UE reads the information in a WUS. Depending on the information in the WUS the UE either continues to Step 2 to read paging DCI in MPDCCH/NPDCCH in order to determine characteristics of Paging Message in PDSCH/NPDSCH or skips directly to Step 3. At step 3 the UE reads the Paging Message in PDSCH/NPDSCH. The WUS can be implemented in different ways to indicate whether the UE is to skip Step 2. The following three options are discussed in more detail below: 1) DCI skipping using 1-bit; 2) DCI skipping using 2-bits; and 3) DCI skipping for specific purpose(s).

1. DCI Skipping Using 1-Bit

According to an example embodiment, a modified WUS includes 1 extra bit of information to indicate whether a UE is to skip the paging DCI reading step (for example Step 2 in FIG. 2). The UE can extract this information directly from demodulation or detection of the WUS without the need for a CRC check. For example, a typical wake up signal may be modified to include an additional bit of information that indicates whether a UE should skip reading the DCI. As a non-limiting example, the additional bit may be set to '0' which means the UE should read the paging DCI as per normal; and the additional bit 306 may be set to '1' to indicate that the UE can skip reading the DCI.

In some example embodiments when the additional bit is set such that it indicates that the UE is to skip reading the DCI, then the UE may also assume one of the following options:

OPTION (A): PDSCH/NPDSCH characteristics that match the previous successful paging message. For this option the eNB must have transmitted at least one paging message DCI in full so that the UE can use it as a reference.

OPTION (B): PDSCH/NPDSCH characteristics as defined in system information (SI).

OPTION (C): PDSCH/NPDSCH characteristics predefined in specifications.

In some example embodiments, multiple of the above options can be supported. For example, the UE can assume Option (A) as the default option, and then the eNB can optionally signal any specific PDSCH/NPDSCH characteristics in SI.

2. DCI Skipping Using 2 or More Bits

According to an example embodiment, the WUS can be extended to effectively carry 2 extra bits of information. For example, a typical wake up signal may be modified to include two additional bits of information. These two additional bits of information, which are conveyed directly without the need of a CRC check, enable the eNB to indicate to the UE one of four different options for the paging DCI. The four options may be predefined, such as being stored in a memory of the UE, and may correspond to a wireless standard. For example, the following four options for the paging DCI may be indicated using the two bits of information:

1. Read DCI
2. Use default paging message configuration #1
3. Use default paging message configuration #2
4. Use default paging message configuration #3

The different default paging message configurations may include different sets of paging message characteristics (such as resource block assignment or any other assignment of channel resources in time domain and/or frequency domain and/or code domain, modulation and coding schemes, repetition number, and/or DCI subframe repetition number for example).

3. DCI Skipping for Specific Purpose(s)

According to an example embodiment an extra bit of information, which can also be indicated by specific WUS sequence or cover code, is used in the WUS to skip DCI reading only for a specific purpose(s). For example, currently paging DCI contains a direct indication field which can be used to inform the UE of changes in system configurations, such as SIB modification or access barring modification for example. According to one example embodiment, this field is included in the WUS so that the UE does not have to read the DCI, in which case the UE may skip reading the DCI as well as the paging message and go directly to reading the SIBs. In some example embodiments, two extra bits may be used to indicate additional changes, such as systemInfoModification, systemInfoModification-eDRX, or eab-ParamModification for example.

According to some example embodiments, the SIB1 scheduling information is provided in the MIB and scheduling information for other SIBs are provided in SIB1, and thus there is no need to further read the DCI or the paging message.

Embodiments according to three options above allow the UE to save power by allowing the UE to skip reading the DCI for the paging message. If all UEs in the PO in which the MPDCCH/NPDCCH carrying that DCI are capable of using the WUS, then transmission of that DCI is no longer required which frees narrowband resources for other traffic.

The paging PDSCH/NPDSCH characteristics include:
Resource block assignment
Modulation and coding scheme
Repetition number
DCI subframe repetition number The embodiments described above also allow backwards compatibility. Thus, for example, a PO can be associated with a combination of UEs that are WUS-capable and those that are not. In that case, the Rel-15 UEs can use the WUS to skip detection of the DCI whereas the legacy UEs would decode the DCI during the PO.

In some scenarios, the network may choose to deliberately pad a paging message (1 paging message can contain multiple paging records) in order to allow capable UEs to use the default 'skip DCI' paging message configuration. According to this example implementation, the default paging message includes N≥2 paging records, and the WUS is used to page fewer than N UEs by padding the paging message corresponding to the unused records.

Information can be encoded in the WUS using various methods including but not limited to the following:

1. Modulation—The 1 bit (or 2 bits) of information can be extracted from coherent demodulation/detection of binary (or quadrature) modulation.

2. Orthogonal cover codes (OCC)—The information is extracted by multiplying the WUS sequence with one of two (or four) OCCs corresponding to the two (or four) states of the 1 bit (or 2 bits) of information. Depending on the type of OCCs, coherent sequence detection or noncoherent detection can be used in this case.

3. Sequence selection—The 1 bit (or 2 bits) of information can be extracted from the sequence used for WUS.

FIG. 3 is a logic flow diagram for using a wake up signal to skip paging DCI. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the WUS module 140-1 and/or 140-2 may include multiples ones of the blocks in FIG. 3, where each included block is an interconnected means for performing the function in the block. The blocks in FIG. 3 are assumed to be performed by the UE 110, e.g., under control of the WUS module 140-1 and/or 140-2 at least in part.

According to an example embodiment, a method is provided including receiving, by a user equipment, a signal either before or during a paging occasion comprising an indication indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message as indicated by block 300; and in response to the indication indicating that the user equipment is to skip decoding of the at least one subsequent channel, skipping decoding of the at least one subsequent channel as indicated by block 302.

The method may include decoding the second channel carrying the paging message based on a set of paging characteristics without decoding the first channel carrying the downlink control information. The indication may be a single bit of information such that the information indicates whether the user equipment is to skip decoding of the first channel. The set of paging characteristics may be the same as a set of characteristics used in a previous paging message successfully received by the user equipment. The set of paging characteristics may be defined in system information. The set of paging characteristics may be a predefined set of paging characteristics stored in a memory of the user equipment. The set of paging characteristics may include at least one of: a resource block assignment; a modulation and coding scheme; a number of repetitions; and a downlink control information subframe repetition number. The method may include determining the set of paging characteristics based on the signal without performing a cyclic redundancy check on the signal. The indication may be at least two bits of information, and the information may indicate one of: the user equipment is to decode the first channel carrying the paging message; and one of at least three different predefined paging message configurations. Skipping decoding of the at least one subsequent channel may include skipping decoding of only the first channel. Skipping decoding of the at least one subsequent channel may be based on at least one event. Skipping decoding of the at least one subsequent channel may include skipping decoding of the first channel and the second channel based on the at least one event. The indication may include at least two bits of information, and the method may include determining, by the user equipment, the at least one event from a plurality of events corresponding to the information. The at least one event may include receiving an indication of a change in system information. The at least one event may include receiving an indication of a change of content of a Multicast Control Channel. The method may include: in response to the indication indicating that the user equipment is not to skip decoding of the at least one subsequent channel, decoding the first channel carrying the downlink control information; and using the downlink control information to decode the second channel carrying the paging message. The user equipment may initially be in an idle mode when the signal is received and the method may include: performing a random access procedure with a base station based on the paging message.

According to another example embodiment, an apparatus is provided including: means for receiving, by a user equipment, a signal either before or during a paging occasion comprising an indication indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the user equipment is to skip decoding of the at least one subsequent channel, means for skipping decoding of the at least one subsequent channel.

The apparatus may include means for decoding the second channel carrying the paging message based on a set of paging characteristics without decoding the first channel carrying the downlink control information. The indication may be a single bit of information such that the information indicates whether the user equipment is to skip decoding of the first channel. The set of paging characteristics may be the same as a set of characteristics used in a previous paging message successfully received by the user equipment. The set of paging characteristics may be defined in system information. The set of paging characteristics may be a predefined set of paging characteristics stored in a memory of the user equipment. The set of paging characteristics may include at least one of: a resource block assignment; a modulation and coding scheme; a number of repetitions; and a downlink control information subframe repetition number. The apparatus may include: means for determining the set of paging characteristics based on the signal without performing a cyclic redundancy check on the signal. The indication may be at least two bits of information, and the information may indicate at least one of: the user equipment is to decode the first channel carrying the paging message; and one of at least three different predefined paging message configurations. The means for skipping decoding of the at least one subsequent channel may include means for skipping decoding of only the first channel. Decoding of the at least one subsequent channel may be skipped based on at least one event. The means for skipping decoding of the at least one subsequent channel may include means for skipping decoding of the first channel and the second channel based on the at least one event. The indication may include at least two bits of information, and the apparatus may include: means for determining, by the user equipment, the at least one event from a plurality of events corresponding to the information. The at least one event may include receiving an indication of a change in system information. The at least one event may include receiving an indication of a change of content of a Multicast Control Channel. The apparatus may include, in response to the indication indicating that the user equipment is not to skip decoding of the at least one subsequent channel, means for decoding the first channel carrying the downlink control information; and means for using the downlink control information to decode the second channel carrying the paging message. The user equipment may initially be in an idle mode when the signal is received and the apparatus may further include: means for performing a random access procedure with a base station based on the paging message.

According to another example embodiment, an apparatus is provided that includes one or more processors and one or more memories including computer program code. The one or more memories and the computer program code are configured to, with the one or more processors, cause the apparatus to perform at least the following: receive, by a user equipment, a signal either before or during a paging occasion comprising an indication indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the user equipment is to skip decoding of the at least one subsequent channel, skip decoding of the at least one subsequent channel.

According to another example embodiment, a computer program is provided including program code for executing: receiving, by a user equipment, a signal either before or during a paging occasion comprising an indication indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the user equipment is to skip decoding of the at least one subsequent channel, skipping decoding of the at least one subsequent channel. The computer program may be a computer program product comprising a computer-readable medium bearing computer program code embodied therein for use with a computer.

FIG. 4 is a logic flow diagram for using a wake up signal to skip paging DCI. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the WUS configuration module 150-1 and/or 150-2 may include multiples ones of the blocks in FIG. 4, where each included block is an interconnected means for performing the function in the block. The blocks in FIG. 4 are assumed to be performed by a base station such as eNB 170, e.g., under control of the WUS configuration module 150-1 and/or 150-2 at least in part.

According to an example embodiment, a method is provided including determining, by a base station, whether at least one user equipment is to skip equipment is to skip decoding of at least one subsequent channel of a plurality of subsequent channels associated with a paging message, wherein the plurality of subsequent channels comprise: a first channel carrying downlink control information for the paging message, and a second channel carrying the paging message as indicated by block 400; and in response to the indication indicating that the at least one user equipment is to skip decoding of the at least one subsequent channel, transmitting an indication to the at least one user equipment either before or during a paging occasion to cause the at least one user equipment to skip decoding of the at least one subsequent channel as indicated by block 402.

The method may include causing the at least one user equipment to decode the second channel carrying the paging message based on a set of paging characteristics without the at least one user equipment decoding the first channel carrying the downlink control information. The indication may be a single bit of information and the method may include: setting the single bit of information to a first value in response to determining that the at least one user equipment is to skip decoding the at least one subsequent channel, and setting the single bit of information to a second value in response to determining that the at least one user equipment is not to skip decoding of the at least one subsequent channel. The set of paging characteristics may be at least one of: a set of paging characteristics used in a previous paging message successfully received by the at least one user equipment; a set of paging characteristics defined in system information; and a predefined set of paging characteristics stored in a memory of the at least one user equipment. The set of paging characteristics may include at least one of: a resource block assignment; a modulation and coding scheme; a number of repetitions; and a downlink control information subframe repetition number. The indication may be transmitted in a signal and the at least one user equipment may be caused to determine the set of paging characteristics without performing a cyclic redundancy check on the signal. The indication may be at least two bits of information and the information may indicate one of: the at least one user equipment is to decode the first channel carrying the paging message; and one of at least three different predefined paging message configurations. The at least one user equipment may be caused to skip decoding of only the first channel. The at least one user equipment may be caused to skip decoding of the at least one subsequent channel based on at least one event. The at least one user equipment may be caused to skip decoding of both the first channel and the second channel based on the at least one event. The indication may be at least two bits of information, and the information may indicate the at least one event from among a plurality of different events. The at least one event may include transmitting an indication of a change in system information. The at least one event may include transmitting an indication of a change of content of a Multicast Control Channel. The method may include: in response to determining that at least two user equipments are associated with the paging occasion and that each of the at least two user equipments are capable of interpreting the indication, preventing transmission of the at least one subsequent channel for the paging occasion. The at least one user equipment may initially be in an idle mode, and the method may include causing, by the base station, the at least one user equipment to perform a random access procedure with the base station based on the paging message.

According to an example embodiment, an apparatus is provided including: means for determining, by a base station, whether at least one user equipment is to skip equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the at least one user equipment is to skip decoding of the at least one subsequent channel, means for transmitting an indication to the at least one user equipment either before or during a paging occasion to cause the at least one user equipment to skip decoding of the at least one subsequent channel.

The apparatus may include means for causing the at least one user equipment to decode the second channel carrying the paging message based on a set of paging characteristics without the at least one user equipment decoding the first channel carrying the downlink control information. The indication may be a single bit of information and the apparatus may include: means for setting the single bit of information to a first value in response to determining that the at least one user equipment is to skip decoding the at least one subsequent channel, and means for setting the single bit of information to a second value in response to determining that the at least one user equipment is not to skip decoding of the at least one subsequent channel. The set of paging characteristics may be at least one of: a set of paging characteristics used in a previous paging message successfully received by the at least one user equipment; a set of paging characteristics defined in system information; and a predefined set of paging characteristics stored in a memory of the at least one user equipment. The set of paging characteristics may include at least one of: a resource block assignment; a modulation and coding scheme; a number of repetitions; and a downlink control information subframe repetition number. The indication may be transmitted in a signal and the at least one user equipment may be caused to determine the set of paging characteristics without performing a cyclic redundancy check on the signal. The indication may be at least two bits of information and the information may indicate one of: the at least one user equipment is to decode the first channel carrying the paging message; and one of at least three different predefined paging message configurations. The at least one user equipment may be caused to skip decoding of only the first channel. The at least one user equipment may be caused to skip decoding of the at least one subsequent channel based on at least one event. The at least one user equipment may be caused to skip decoding of both the first channel and the second channel based on the at least one event. The indication may be at least two bits of information, and the information may indicate the at least one event from among a plurality of different events. The at least one event may include transmitting an indication of a change in system information. The at least one event may include transmitting an indication of a change of content of a Multicast Control Channel. The apparatus may include: in response to determining that at least two user equipments are associated with the paging occasion and that each of the at least two user equipments are capable of interpreting the indication, means for preventing transmission of the at least one subsequent channel for the paging occasion. The at least one user equipment may initially be in an idle mode, and the apparatus may include means for causing, by the base station, the at least one user equipment to perform a random access procedure with the base station based on the paging message.

According to another example embodiment, an apparatus is provided that includes one or more processors and one or more memories including computer program code. The one or more memories and the computer program code are configured to, with the one or more processors, cause the apparatus to perform at least the following: determine, by a base station, whether at least one user equipment is to skip equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and in response to the indication indicating that the at least one user equipment is to skip decoding of the at least one subsequent channel, transmit an indication to the at least one user equipment either before or during a paging occasion to cause the at least one user equipment to skip decoding of the at least one subsequent channel.

According to another example embodiment, a computer program is provided including program code for executing: determining, by a base station, whether at least one user equipment is to skip decoding of downlink control information for a paging message, or whether the at least one user equipment is to decode the downlink control information; and in response to determining that the at least one user equipment is to skip decoding of downlink control information for the paging message, transmitting an indication to the at least one user equipment either during or before a paging occasion such that the at least one user equipment is caused to decode the paging message based on a set of paging characteristics without decoding the downlink control information. The computer program may be a computer program product comprising a computer-readable medium bearing computer program code embodied therein for use with a computer.

Without in any way limiting the scope, interpretation, or application of the claims appearing below, a technical effect of one or more of the example embodiments disclosed herein is allowing a UE to skip reading DCI of a paging message and thus allows the UE to save power. Another technical effect of one or more of the example embodiments disclosed herein is freeing narrowband resources. In particular, if all UEs in a PO in which the MPDCCH/NPDCCH carrying that DCI are capable of using the WUS, then transmission of that DCI is no longer required.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

eDRX extended DRX
eMTC physical layer enhancements for Machine Type Communications
eNB evolved Node B (e.g., an LTE base station)
I/F interface
LTE long term evolution
MME mobility management entity
MPDCCH MTC physical downlink control channel
NB-IoT narrowband Internet of Things
NCE network control element
N/W network
NPDCCH narrowband physical downlink control channel
NPDSCH narrowband physical downlink shared channel
OCC orthogonal cover code
PDCCH physical downlink control channel
PDSCH physical downlink shared channel
PO paging occasion
RRH remote radio head
Rx receiver
SGW serving gateway
Tx transmitter
UE user equipment (e.g., a wireless, typically mobile device)
WUS wake-up signal

What is claimed is:

1. A method, comprising:
receiving, by a user equipment, a signal either before or during a paging occasion comprising an indication for indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and
decoding the second channel based on a set of paging characteristics without decoding of the first channel, in response to the indication indicating that the user equipment is to skip decoding of the first channel.

2. A computer program product comprising a non-transitory computer-readable storage medium bearing computer program code embodied therein for use with a computer, the computer program code comprising code for performing the method of claim 1.

3. The method of claim 1, wherein the indication is a single bit of information such that the information indicates whether the user equipment is to skip decoding of the first channel.

4. The method of claim 1, wherein at least one of the following options applies:
the set of paging characteristics is the same as a set of characteristics used in a previous paging message successfully received by the user equipment;
the set of paging characteristics is defined in system information; and
the set of paging characteristics is a predefined set of paging characteristics stored in a memory of the user equipment.

5. The method of claim 1, wherein the set of paging characteristics comprises at least one of:
a resource block assignment;
a modulation and coding scheme;
a number of repetitions; and
a downlink control information subframe repetition number.

6. The method of claim 1, and the method further comprising determining the set of paging characteristics based on the signal without performing a cyclic redundancy check on the signal.

7. An apparatus comprising one or more processors and one or more memories including computer program code, the one or more memories and the computer program code are configured to, with the one or more processors, cause the apparatus to perform at least the following:
receive, by a user equipment, a signal either before or during a paging occasion comprising an indication for indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and
decode the second channel based on a set of paging characteristics without decoding of the first channel, in response to the indication indicating that the user equipment is to skip decoding of the first channel.

8. The apparatus of claim 7, wherein the indication is a single bit of information such that the information indicates whether the user equipment is to skip decoding of the first channel.

9. The apparatus of claim 7, wherein at least one of the following options applies:
the set of paging characteristics is the same as a set of characteristics used in a previous paging message successfully received by the user equipment;
the set of paging characteristics is defined in system information; and
the set of paging characteristics is a predefined set of paging characteristics stored in a memory of the user equipment.

10. The apparatus of claim 7, wherein the set of paging characteristics comprises at least one of:
a resource block assignment;
a modulation and coding scheme;
a number of repetitions; and
a downlink control information subframe repetition number.

11. The apparatus of claim 7 and the one or more memories and the computer program code are further configured to, with the one more processors, cause the apparatus to determine the set of paging characteristics based on the signal without performing a cyclic redundancy check on the signal.

12. The apparatus of claim 7, wherein the indication is at least two bits of information, and wherein the information indicates at least one of:
the user equipment is to decode the first channel; and
one of at least three different predefined paging message configurations.

13. The apparatus of claim 7, wherein the decoding of the at least the first channel is skipped based on at least one event.

14. The apparatus of claim 13, wherein the decoding of the first channel and the second channel is skipped based on the at least one event.

15. The apparatus of claim 13, wherein the indication comprises at least two bits of information, and the one or more memories and the computer program code are further configured to, with the one or more processors, cause the apparatus to:
determine, by the user equipment, the at least one event from a plurality of events corresponding to the information.

16. The apparatus of claim 13, wherein the at least one event comprises receiving an indication of a change in system information.

17. The apparatus of claim 13, wherein the at least one event comprises receiving an indication of a change of content of a Multicast Control Channel.

18. The apparatus of claim 7, and the one or more memories and the computer program code are further configured to, with the one or more processors, cause the apparatus:
in response to the indication indicating that the user equipment is not to skip decoding of the first channel, to decode the first channel; and
to use the downlink control information to decode the second channel.

19. The apparatus of claim 7, wherein the user equipment is initially in an idle mode when the signal is received, and the one or more memories and the computer program code are further configured to, with the one or more processors, cause the apparatus to perform a random access procedure with a base station based on the paging message.

20. An apparatus comprising one or more processors and one or more memories including computer program code, the one or more memories and the computer program code are configured to, with the one or more processors, cause the apparatus to perform at least the following:

transmit, to a user equipment, a signal either before or during a paging occasion comprising an indication for indicating whether the user equipment is to skip decoding of at least one subsequent channel of a plurality of subsequent channels associated with a paging message, wherein the plurality of subsequent channels comprise: a first channel carrying downlink control information for the paging message, and a second channel carrying the paging message; and transmit the second channel based on a set of paging characteristics, in response to the indication indicating that the user equipment is to skip decoding of the first channel.

* * * * *